J. A. WALSH.
GRAIN SAVING DEVICE FOR THRESHING MACHINES.
APPLICATION FILED NOV. 16, 1914.

1,179,786.

Patented Apr. 18, 1916.

WITNESSES:

INVENTOR

James A. Walsh.

UNITED STATES PATENT OFFICE.

JAMES A. WALSH, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

GRAIN-SAVING DEVICE FOR THRESHING-MACHINES.

1,179,786. Specification of Letters Patent. Patented Apr. 18, 1916.

Application filed November 16, 1914. Serial No. 872,330.

*To all whom it may concern:*

Be it known that I, JAMES A. WALSH, a citizen of the United States, residing at Indianapolis, in the county of Marion and State of Indiana, have invented certain new and useful Improvements in Grain-Saving Devices for Threshing-Machines, of which the following is a specification.

In the type of grain saving devices for threshing machines associated with the wind stacker and forming a part of the machine, it is the practice to employ a stationary trap in connection with the material-receiving receptacle and the stacker fan, which captures loose grain and unthreshed heads of grain, which, in the ordinary type of such stacker, would be drawn into the stacker fan and discharged with other material onto the straw stack and become lost, and in connection with such trap a conveyer is usually employed for returning the saved grain to the threshing machine to be recleaned, or to deliver it upon the ground or in receptacles.

The object of my invention is to dispense with such stationary trap and conveyer, and to provide a grain saver which will both trap the grain and convey it to the point desired, in a simple and expeditious manner.

Figure 1:
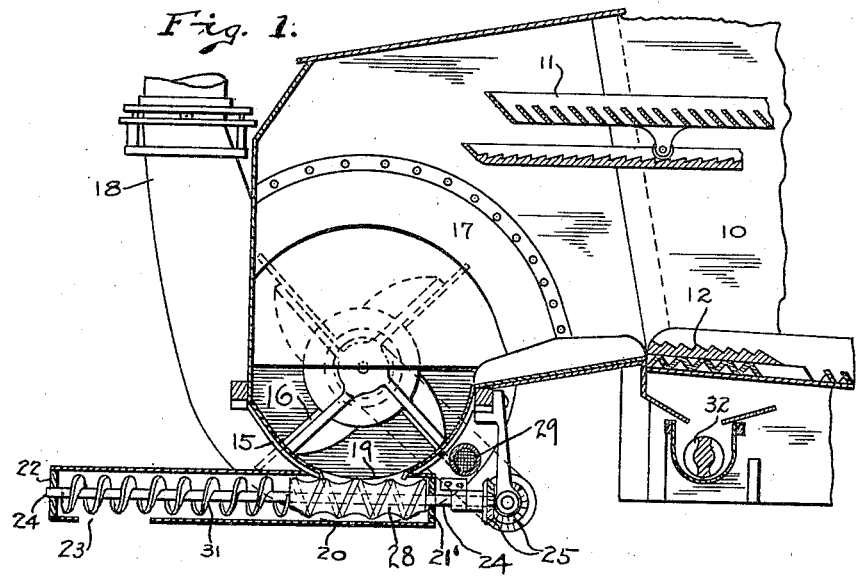
Figure 2:
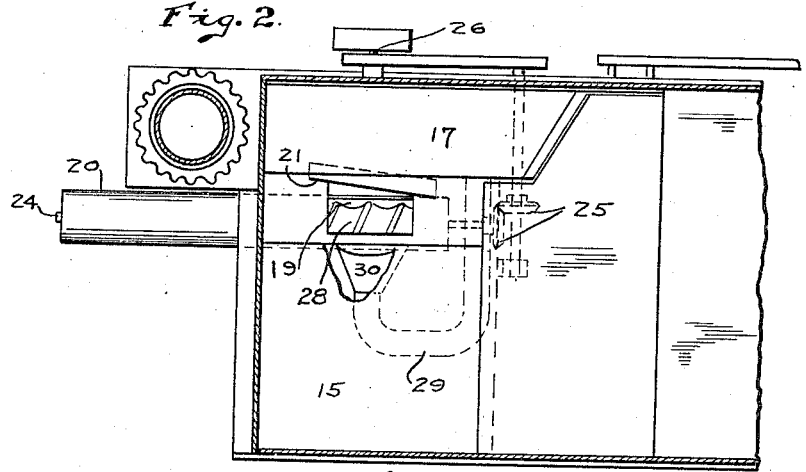
Figure 3:
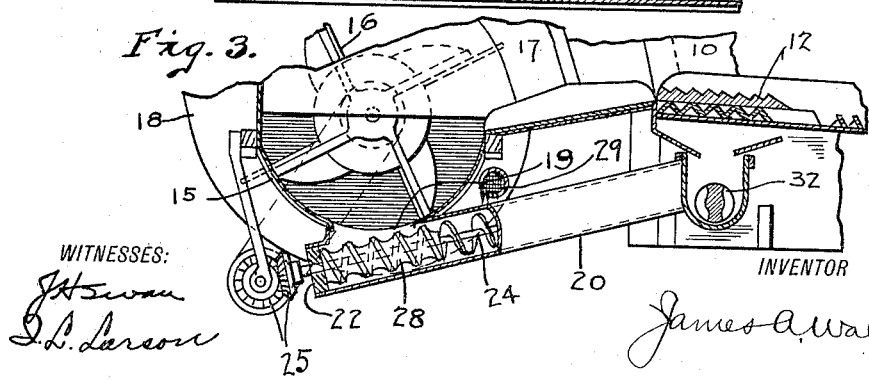

In the accompanying drawings, which form a part hereof, Figure 1 is a longitudinal sectional view through the rear end of a threshing machine and a wind stacker, showing the application of my invention; Fig. 2 a plan, and Fig. 3 a fragmentary sectional view, showing a modified arrangement of my improved grain saver.

In said drawing, the portions marked 10 indicate a threshing machine of any approved form, provided with a straw carrier, 11, and chaff riddle or winnower, as 12, which communicates with a material-receiving receptacle, such as a wind stacker hopper, 15, the latter communicating with a burden fan, 16, positioned within a fan casing, 17, for discharging material through the stacker chute, 18, as is customary.

The hopper 15 may be of any desired form, a portion thereof adjacent the fan casing being cut away, as indicated at 19, Fig. 2. At the lower side of the fan eye a flanged or other suitable member 21, is provided, which constitutes a grain deflector. Beneath said hopper 15, I provide a boxing, as 20, having ends, 21', 22, and an outlet, 23, in which boxing I mount a spiral conveyer, the shaft 24, thereof being supported in said ends 21' and 22, suitable mechanism as intermeshing gearing, 25, being associated with said shaft and the shaft, 26, of the stacker fan or other source for driving said conveyer.

In carrying out my invention, the conveyer, at the portion thereof which is positioned at the opening in the hopper, is provided with spirals or similar guides, 28, which, at their upper sides, substantially aline with the deflector 21, so that they will serve as guides over which straw, chaff, etc., will ride into fan 16 to be discharged through chute 18, while loose grain and unthreshed heads will fall between said guides or trap and be directed to the lower side of boxing 20. To assist in the separation of such grain and heads, I prefer to employ a blast introduced across said trap, which may be supplied by the stacker fan, through pipe, 29, and distributed by nozzle, 30, or from any other suitable source for the purpose.

In operation, the straw and chaff discharged from the threshing machine into hopper 15 will be drawn into the stacker fan, as usual, but as such material passes over the grain trap the air blast from nozzle 30 winnows the grain and unthreshed heads therefrom, which fall between guides 28, that portion of which is driven beneath deflector 21 being directed downwardly into the trap. When it is desired to convey such material to the rear of the stacker to be delivered onto the ground or in sacks, I employ the arrangement shown in Fig. 1, by which the saved grain in the trap is directed to the flights, 31, and by them conveyed through the outlet 23. As will be readily understood, however, when it is desired to convey such grain into the threshing machine to be recleaned, I may direct said material to the tailings auger, 32, of said machine, or otherwise, and rotate the same in substantially the manner indicated in Fig. 1, or by any other suitable means for the purpose. By combining the grain trap and conveyer substantially in the manner indicated, I am enabled to dispense with certain devices and attachments now in use, and at the same time provide a simple and positive means for saving grain, which, in the common form of wind stackers, has heretofore been discharged into the stack with the straw and thus lost.

I claim as my invention:

1. In a device of the character described, a material receiving and conveying receptacle, a fan drum communicating therewith, a fan in said drum, a casing in advance of said drum, and a rotary separator and conveyer in said casing constituting a trap for receiving and separating grain from other material passing into said drum and conveying such grain away from said fan to be saved.

2. In a device of the character described, a material receiving and conveying receptacle, a fan drum communicating therewith, a fan in said drum, a casing in advance of said drum, and a spirally arranged rotary separator and conveyer in said casing constituting a trap for receiving and capturing grain separated from other material and conveying the same to be deposited as desired.

3. In a device of the character described, a material receiving and conveying receptacle, a fan drum communicating therewith, a fan in said drum, a casing in advance of said drum, a rotary separator and conveyer in said casing constituting a trap for receiving and capturing grain from other material passing from said receptacle into said fan, and means for rotating said separator to convey material from said casing.

4. The combination, with a material receiving and conveying receptacle, of a fan for withdrawing material from said receptacle and conveying the same therefrom, a casing in advance of said fan, a combined rotary separator and conveyer in said casing constituting a grain trap for receiving and capturing grain from such material and conveying the same to be deposited as desired, and means for actuating said separator.

5. The combination, with a material receiving and conveying receptacle, of a fan for withdrawing material from said receptacle and conveying the same therefrom, a casing in advance of said fan, a rotary separator and conveyer in said casing communicating with said receptacle, means for producing a blast in said receptacle for winnowing grain from material passing from said receptacle into said fan to direct such grain into said separator, and means for actuating said separator to convey such grain to be deposited as desired.

In testimony whereof I affix my signature in presence of two witnesses.

JAMES A. WALSH.

Witnesses:
BRUCE NIPPLE,
LEE R. GARBER.